Jan. 14, 1964 R. W. STENZEL 3,117,920
ELECTRODE STRUCTURE FOR EMULSION TREATMENT
Filed June 22, 1959 2 Sheets-Sheet 1
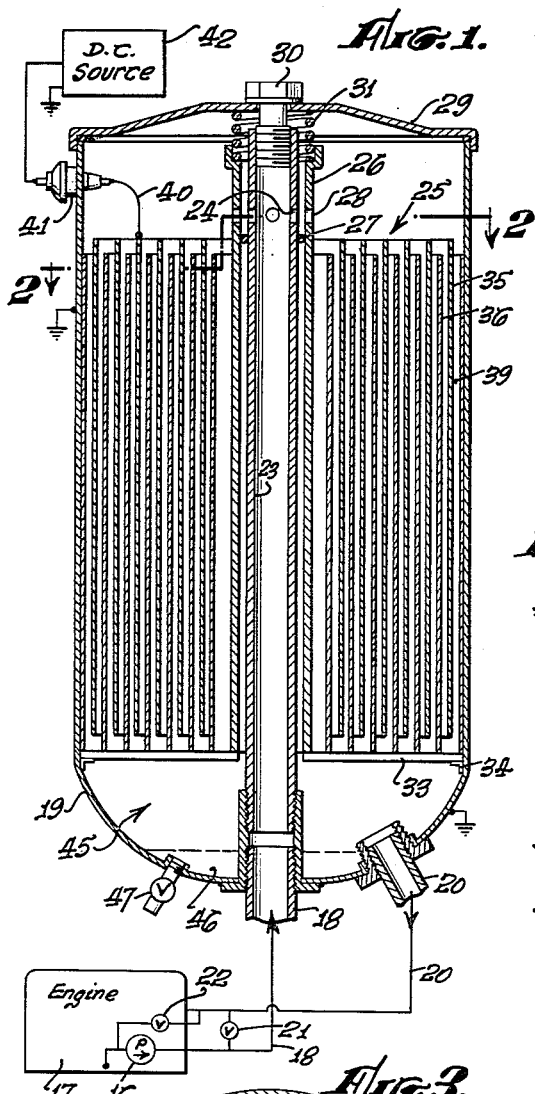
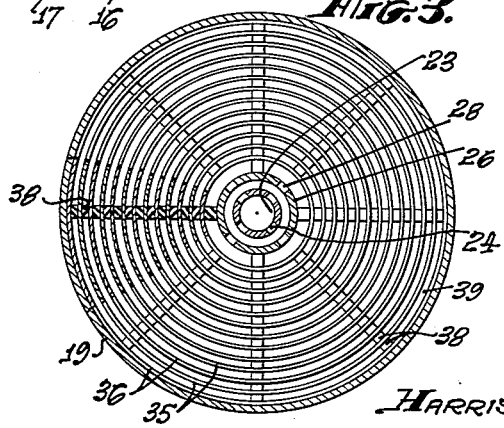
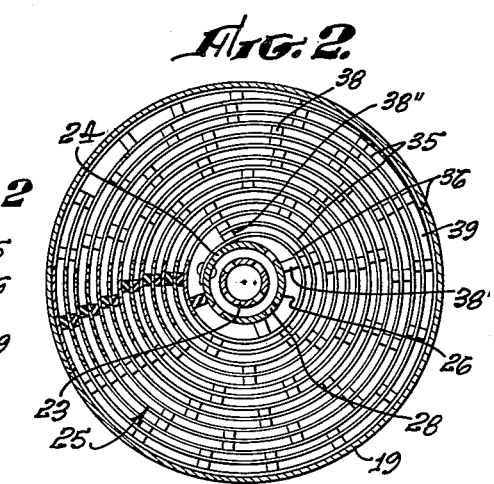
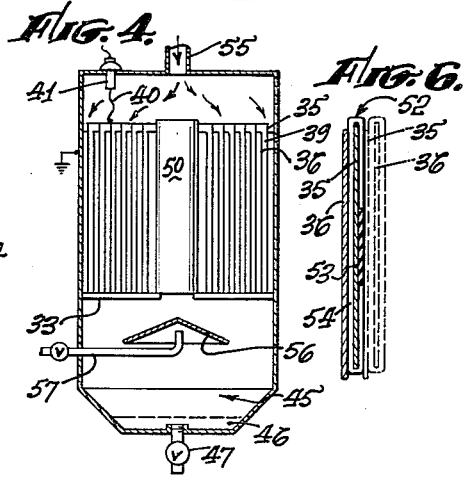
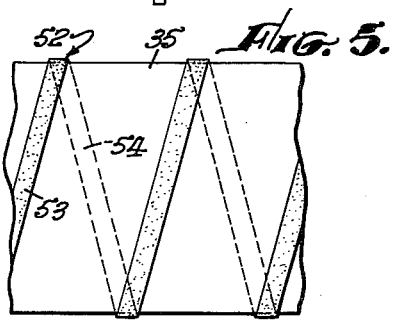
INVENTOR.
RICHARD W. STENZEL,
By His Attorneys
HARRIS, KIECH, RUSSELL & KERN.

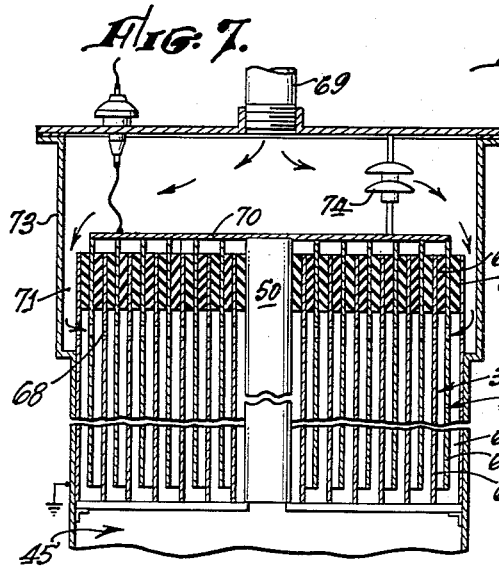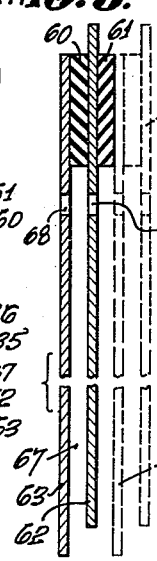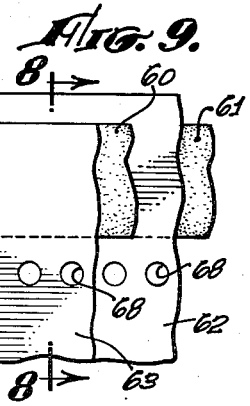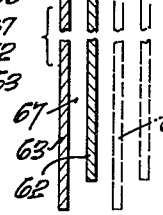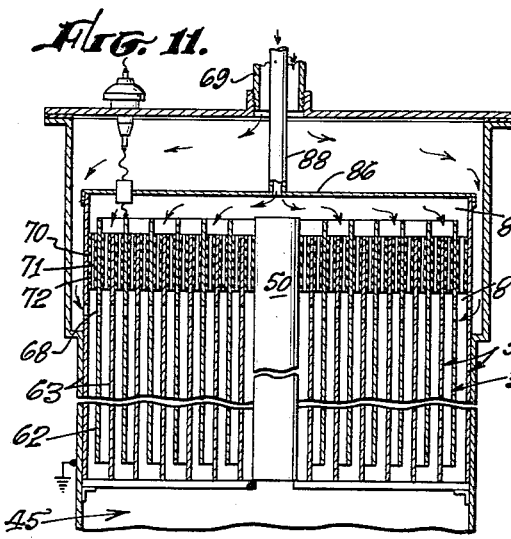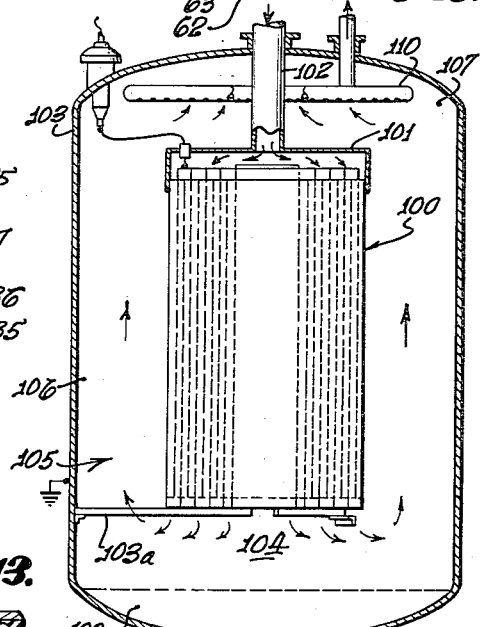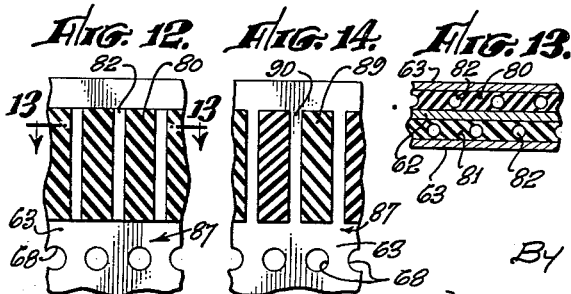

United States Patent Office 3,117,920
Patented Jan. 14, 1964

3,117,920
ELECTRODE STRUCTURE FOR EMULSION TREATMENT
Richard W. Stenzel, Palos Verdes Estates, Calif., assignor to Petrolite Corporation, Wilmington, Del., a corporation of Delaware
Filed June 22, 1959, Ser. No. 822,042
14 Claims. (Cl. 204—302)

My invention relates to the purification of contaminated oils by use of electric treating equipment in the nature of an electric filter. It relates also to a novel method and apparatus for producing a treating unit or electrode unit useful in the purification of contaminated oils.

It is known that appropriate unidirectional electric fields can reduce to quite low values the residual dispersed material in oils that have previously been subjected to a purifying treatment adapted to remove the bulk of the dispersed material therein. Best results are obtained by use of parallel electrodes that bound side-by-side open-ended treating spaces in which coalescence and gravitational separation take place. In commercial practice electrode spacings of 3–6 inches have been used successfully but commercial attempts to use smaller spacings and lower applied voltages have not been successful, largely because uniform smaller electrode spacings cannot be commercially maintained.

It is common practice to form the treating spaces by intermeshing parallel electrodes of two electrode sets insulated from each other, the electrodes being flat or cylindrical, the electrodes of one set being supported from one end by a suitable framework and the electrodes of the other set being supported from the other end by a separate framework. In large treaters, spacings less than about 3 inches cannot be commercially maintained because of this mounting and the difficulty of making all electrodes of a set truly parallel or of exactly complementary shape particularly if thin electrode material is used. Likewise an initially uniform spacing is often destroyed by warpage when electrodes thus mounted are subjected to changes in temperature.

It is an object of the invention to provide a novel manner of mounting closely spaced electrodes. A further object is to provide an electrode support that permits smaller and more accurate electrode spacings and which maintains these spacings in operation.

A further object is to provide a novel electrode structure and method of making same. In this connection it is an object of the invention to provide a simple internally-insulated electrode structure that can be set on a grounded support of a vessel without danger of short-circuiting. It is a further object to employ spacing insulators between adjacent turns of two electrodes of different potential and in some instances to form an electrode structure by wrapping spirally two strips of metal, the turns being spaced by insulator strips or spacers bridging the metal strips and wedged therebetween.

It has further been found that the electrical action between electrodes spaced less than about an inch becomes different, particularly if the spacing is made only a small fraction of an inch. This can best be understood by considering the action that can be observed in a transparent cell filled with a dispersion in which the continuous phase is a transparent oil and the dispersed phase is a liquid which clouds the system even though present in only small amounts. The dispersion may bridge flat electrodes spaced a matter of an inch or two. When the electrodes are energized from a source of unidirectional potential to establish a gradient of 1 kv./in. or more in the intervening treating space it has been found that the dispersion clears first in narrow zones immediately adjacent the electrode surfaces. These zones are quite shallow, being usually no more than a few millimeters in thickness. Within these zones individual particles can often be observed to bounce toward and away from the electrode, probably as a result of changes in electric charge. If the electrodes of commercial treaters could be brought closer together advantage can be taken of the bouncing or electric oscillation of the particles to increase the probability of contact and coalescence thereof.

It is an object of the present invention to employ such small electrode spacings that the particles bouncing or oscillating in a unidirectional electric field in the immediate vicinity of one electrode are moved into the influence of the opposite electrode or of particles bounced or oscillated thereby.

It is a further object of the invention to flow the impure oil or dispersion through treating spaces in the direction in which gravity acts on the coalesced particles of the dispersed phase. This is the reverse of present practice in treating with unidirectional fields. With a dispersed material that is denser than the surrounding oil, it is an object to flow the oil to be treated downward in upright treating spaces into a settling zone or chamber.

By use of the invention it becomes possible to make small compact electric treaters particularly suited to oil systems of high resistivity and low dispersed phase content whether the latter is formed of liquid or solid particles. Treaters of the type to be described are capable of purifying contaminated oils such as dielectric oils, used lubricating oils, fuels that have become contaminated with small amounts of solid or liquid substances immiscible therewith, oils that have been partially purified by previous electrical, chemical or heat and pressure systems, oils that have become hazed by cooling to cause dissolved water to appear as minute droplets, etc.

It is an important object to provide an electric treater capable of subjecting an oil to a high potential gradient with a relatively low voltage applied to the electrodes.

Further objects and advantages will be apparent to those skilled in the art from the following description of exemplary embodiments illustrated in the accompanying drawings in which:

FIG. 1 is a vertical sectional view of the invention adapted to an automotive type filter housing for purifying the oil circulating through an internal combustion engine;

FIG. 2 is a horizontal cross-sectional view taken along the line 2—2 of FIG. 1;

FIG. 3 is a similar horizontal cross-sectional view of an alternative form;

FIG. 4 is a vertical sectional view of an alternative embodiment while FIG. 5 is an elevational view of one of the electrode strips of the wrapped electrode structure of FIG. 4 and FIG. 6 is a fragmentary sectional view of one composite turn of the wrapped electrode structure of FIG. 4 with an adjacent turn shown in dotted lines;

FIG. 7 is a vertical sectional view of a further alternative embodiment, FIG. 8 being an enlarged detail showing one composite turn of the wrapped electrode structure of FIG. 7 with an adjacent turn in dotted lines. FIG. 9 is a fragmentary elevational view of the components of one turn, FIG. 8 being taken along the line 8—8 of FIG. 9;

FIG. 10 is a fragmentary vertical sectional view of an alternative form of wrapped electrode structure;

FIG. 11 is a vertical sectional view of a further alternative, FIG. 12 being a fragment of one turn of the electrode structure of FIG. 11 with the insulation shown in section, FIG. 13 being a horizontal section of adjacent turns taken as indicated by the line 13—13 of FIG. 12;

FIG. 14 is a view similar to FIG. 12 illustrating a further alternative; and

FIG. 15 is a vertical sectional view, partly in elevation, of a larger treater of the invention in which may be incorporated any of the electrode structures to be described.

Referring specifically to FIGS. 1 and 2, the embodiment is in effect an electric filter and is illustrated as applied to a conventional circulating system of an internal combustion engine in which contaminated lubricating oil is circulated by a pump 16 from an engine 17 through a pipe 18 to a filter housing 19, the purified oil returning to the engine through a line 20. A by-pass valve 21 is provided to by-pass some of the oil constantly, intermittently or upon any restriction of the treating equipment in the housing 19. If this valve normally by-passes most of the circulating oil it can be periodically restricted to increase the flow through the treating equipment to wash or flush same. Alternatively, a valve 22 can be opened to connect the pump intake to the purified oil line 20 to circulate pure oil through the unit at a much greater rate than normal to wash or flush any accumulated contaminants from the treating equipment within the housing should these be troublesome.

The housing 19 contains the usual standpipe 23 common to filters of the automotive type, openings 24 therein delivering the contaminated oil to the top of the housing for downward flow through a replaceable treating unit 25, here incorporating the treating equipment to be described and including a tubular post or core member 26 sealed from the standpipe 23 as by one or more O-rings 27 and having openings 28 cooperating with the openings 24 to carry the oil outward. A cover 29 is held in place by a screw 30 threaded into the top of the standpipe 23 tightening of the screw compressing a spring 31 which bears on the core member 26 to hold the replaceable unit 25 down, here against internal support member shown as arms 33 forming a part of an interstitial frame supported by and grounded to the housing 19 by brackets 34.

The treating unit 25 comprises a wound electrode assembly containing spiral live and grounded electrodes 35 and 36 separated by insulating spacers 38 (FIG. 2). The latter are in this embodiment spaced strips of insulating material of a class not readily wetted by acids or aqueous solutions. Among presently known materials those having a waxy surface have proved best, e.g. polytetrachloroethylene (e.g. "Teflon"), polytrifluorochloroethylene (e.g. "Kel-F"), polyethylene, etc., as they resist coatings of water or chemicals that would build up as electrically conducting surface coatings in use.

The electrodes 35 and 36 are long strips of thin metal wound with intervening spacers 38 between coaxial interspaced turns spaced to define treating spaces 39 therebetween, the spacers being here of a length substantially equal to the axial length of the treating spaces or to the overlap of the electrodes. Each treating space is preferably of a width, measured radially of the unit, very much less than its length, measured axially of the unit. Such width is less than about 1 inch and preferably in the range of about .05–.5 inch. The length of each treating space is usually about 5–100 times its width. Some features of the invention are quite useful, however, in treaters of more conventional design in which the electrodes are more widely spaced or of a length:width ratio substantially different from those exemplified.

The innermost turn of the unit is preferably a grounded turn and may be attached to and wound around the core member 26, spiralling outward therefrom to receive the first spacer 38′ (FIG. 2) of an inner series on the inner side of the grounded electrode 36. The live electrode 35 starts opposite the first spacer 38″ of an outer series on the other or outer side of the grounded electrode 36. The spacers of the two series can be randomly spaced but are shown as in radial pairs spaced about equally from each other along the length of the spiral. The spacing of the spacers 38 should be such as to maintain the intervening segments of the turns in substantially their spiral form thus forming a pattern of uniformly but closely spaced live and grounded electrodes throughout the cross section of the housing. The material of the outermost turn of the grounded electrode of the unit is preferably wrapped back on its previous turn to make a completely grounded substantially cylindrical wall shaped to slide within the housing 19 in electrical contact therewith. The housing is grounded as shown, as is also the standpipe 23. In this way one or both of the end turns of the grounded electrode forms the outer and inner terminus of the electrode system and can cover and protect the adjacent end of the live electrode.

During the winding, the electrode-forming strips or corresponding edges thereof may be slightly displaced from each other so that the grounded electrode 36 projects a corresponding distance at one end of the unit and forms a spiral edge terminating in a plane beyond the corresponding spiral edge of the other electrode. With equal-width strips this will make the live electrode 35 project as a spiral edge at the other end of the unit. The unit is inserted so that the projecting grounded electrode 36 rests on the support provided by the arms 33. The upwardly projecting portion of the live electrode 35 is connected by a lead 40 to the terminal of a removable bushing 41 and thence to the high-voltage terminal of a source of potential 42. The latter is preferably a unidirectional source but may be of the alternating type if less exacting results can be tolerated.

Voltage gradients ranging from a fraction of a kv./in. to 50–100 kv./in. may be successfully used, depending on the system being treated. The impure oil is jetted outward through the openings 24, 28 into the upper interior of the container and thereby distributed between the large number of open-ended treating spaces 39 each bounded by adjacent turns of the live and grounded electrodes and by two of the spacers 38. The action in the treating spaces is predominantly one of agglomeration of the minute dispersed particles into somewhat larger particles capable of settling from the oil phase. However the unique downflow of the oil through the treating spaces insures that there is substantially no separation from the oil of the agglomerated particles within the treating spaces. Instead, the treated streams enter a settling chamber 45 below the electrode unit and of any desired height. Therein the agglomerated particles settle, forming a body 46 of separated contaminants which can be drained from time to time by opening a pet cock or drain valve 47. If the impure system carries exclusively liquid particles, the agglomeration usually results in coalescence into larger particles that readily separate in the chamber 45. If the impure system carries solid particles, these are largely electrically agglomerated with each other or with liquid particles that may be present to produce agglomerated particles that settle to the body 46 as before. Here any such agglomerated particles can collect or they can be periodically washed out by opening the drain valve 47. In some instances the particles may be of a character to electrically deposit on one or the other of the electrodes during transit through the treating spaces 39. In such event they will be flushed from the electrode surfaces from time to time either automatically, as a result of the increased velocity in the treating spaces which takes place as a deposit tends to restrict them, or by increase in the flow rate during a clean-out period, as by manipulation of the valves 21, 22 and/or increase in the pressure of the pump 16.

FIG. 3 shows an alternative way of forming the live and grounded electrodes 35 and 36, namely by assembling equal-length sections of metal tubing of different diameter with the spacers 38 compressed therebetween in random or in radial patterns to control the spacings. The resulting electrode unit will closely resemble that of FIGS. 1 and 2 but the individual coaxial interspaced turns will be circular and not spiral. As before, the outermost and innermost turns are preferably grounded. The intervening turns can be grounded by contact with the arms 33. The turns of the live electrode must be electrically connected together in this embodiment by a separate conductor, not shown.

FIGS. 4, 5 and 6 show an extremely simple way of insulating closely spaced electrodes. The live and grounded electrodes 35 and 36 are here, as in FIGS. 1 and 2, wrapped spirally about a core member 50 which is here shown as imperforate. However one of the electrode strips, preferably that from which the live electrode 35 is to be formed, is initially wrapped spirally in widely spaced turns with a tape or strip 52 of insulating material of the type previously defined, forming sections 53 and 54 angling in opposite directions on opposite sides of the electrode strip (FIG. 5). The thickness of the strip 52 equals the desired electrode spacing. The other electrode strip is then laid on the wound strip and the pair rolled together around the core 50 until the unit is of such size as to fit into the housing 19, here shown as of somewhat different shape than in FIG. 1. The resulting treating spaces 39 are the interturn spaces between the spaced sections of the turns of the strip 52 and angle in opposite directions about the central axis on opposite sides of either electrode, thus tending to avoid a swirling action in the settling zone 45. In this embodiment the influence impure oil flows directly into the upper zone of the housing through a pipe 55. The electrically treated oil streams flowing downward from the treating spaces 39 are guided to the outer portion of the settling space 45 by a conical baffle 56. After settling in the settling chamber 45 the purified oil is withdrawn from a point below the apex of the baffle through a valved pipe 57. A similar baffle and draw off can be used in the other described embodiments of the invention.

Somewhat differently insulated spiral electrodes 35 and 36 are shown in FIGS. 7, 8 and 9. Here insulating tapes or strips 60 and 61 of a thickness corresponding to the desired electrode spacing are placed along opposite top edges of an electrode strip 62 or respectively along the top edges of each of the electrode strips 62 and 63 before spirally winding the composite about the metallic core 50. The result is an electrode unit in which the electrodes 35 and 36 are insulated and spaced exclusively at their upper ends by the spiral insulator strips 60 and 61. The treating spaces 67 thus formed are here continuous spiral spaces open at their lower ends but blocked at their upper ends by the insulating strips.

To give access to the upper ends of these treating spaces a suitable ingress means is employed. In this respect the electrode strips 62 and 63 have rows of openings 68 just below the insulator strips 60 and 61 at levels that are horizontally aligned. The impure oil enters the top of the housing 19 through a pipe 69 and is spread by an imperforate hood 70 covering the turns of the live electrode 35 to an annular passage 71 formed between an enlarged section 73 of the housing and the outermost turn of the grounded electrode 36. The passage 71 extends to the level of the openings 68, the latter conducting the impure oil inward to the upper portions of the various treating spaces 67. If desired the hood 70 may be attached to the turns of the live electrodes 35 and supported by suspension insulators 74 as an aid to or as a substitute for the support for the grounded electrode provided by the framework arms 33 previously described. The separated materials can be withdrawn from the settling space 45 in any of the ways previously described.

In cases where the contaminants of the oil are conductive and tend eventually to bridge the electrodes along the surfaces of the insulating strips 60 or 61, short circuiting can be prevented or postponed by lengthening the insulating surfaces that bridge the electrodes. Thus in FIG. 10 a thinner but wider coating or strip 76 of the aforesaid insulating material spaces each electrode strip 62, 63 from its adjacent insulating strip 60, 61. The width of such coating or strip 76 measured axially of the electrode structure or longitudinally of the treating spaces 67 is greater than the width of the insulating strips 60, 61. The exposed portions of the coatings or strips 76 thus greatly elongate the surface path between two adjacent turns of the electrodes 35, 36 and thus substantially reduce the danger of short-circuiting.

In treating oils in which conductive contaminants are particularly conductive to deposition on the insulation surfaces the embodiment of FIGS. 11–13 can be employed as a modification of FIGS. 7–9. Here the electrodes 35 and 36 are spaced by a passaged insulation means shown as strips 80 and 81 having passages 82 therethrough transverse to their lengths. When these strips are positioned as described with reference to FIG. 7 the passages extend parallel to the electrode strips 62 and 63 and open at their upper ends on a space 85 formed beneath a hood 86. The outermost turn of the grounded electrode is here made wider so as to extend above the other turns to be covered by the hood 86. The lower ends of the passages 82 open on an insulation protective zone 87 between the strips of insulating material 80, 81 and the level of the openings 68 through the electrodes. To the space 85 is supplied from a pipe 88 a small stream of clean dielectric fluid substantially free of contaminants, e.g., a small stream of the oil previously purified by this or other treaters. This oil exudes through the passages 82 to fill the upper interiors of the interelectrode spaces above the openings 68, namely the insulation protective zone 87 previously described. The openings 68 receive the contaminated oil from the annular passage 71 as supplied by the pipe 69. However, the downward flow of the clean oil in the upper interiors of the interelectrode spaces forms a moving or constantly renewed liquid shield having the insulation means and keeping the contaminants of the impure oil from the vicinity thereof. In this manner liquid can be uniquely introduced into the interelectrode treating spaces both through the side and top of an electrode unit respectively through first and second delivery means, the two liquids blending and flowing along the active treating spaces into the settling chamber 45.

Instead of using passages 82 through the insulation strips 80 and 81, the passaged insulation means may be made sectional, as suggested in FIG. 14. Thus each insulation strip can be made of sections or strips 89 spaced from each other along the spiral electrodes to form passages 90 therebetween functioning the same as the passages 82. The sections or strips 89 can be sequentially positioned as the electrodes are being wound, in a manner similar to that described with reference to FIGS. 1 and 2. Here and in the other embodiments the winding will be controlled to be sufficiently tight to hold the strips of insulation in place by being clamped or compressed between adjacent turns of oppositely poled electrodes.

The passages 82 or 90 may also be used to supply to the treating spaces the contaminated oil if the latter is not of a character to coat the insulation surfaces conductively. Thus FIG. 15 shows an electrode unit 100 constructed in accordance with any of the previously described embodiments covered by a hood 101 to which the impure oil is supplied through a pipe 102 extending through the top of a large container 103. The oil is distributed between the narrow treating spaces and flows downward therethrough for the agglomerating action previously described, the streams discharging openly downward between arms 103a of an electrode supporting framework into the lower portion 104 of a settling chamber 105. In this embodiment a large proportion of the settling chamber is a wide annular space 106 surrounding the electrode unit 100 and opening on an upper oil zone 107 of the settling chamber. All portions 104, 106 and 107 of the settling chamber 105 are here available for gravitational settling of the agglomerated material, which settles to a body 108 from which it can be withdrawn through a valved pipe 109. The purified oil is withdrawn from the upper oil zone 107, preferably through a perforated ring pipe 110 which withdraws oil equally at different peripheral positions and thus equalizes the upflow in all circumferential zones of the annular space 106.

The embodiment of FIG. 15 is readily adapted to the treatment of large-volume streams of contaminated oils at a relatively rapid rate. The feature of having the settling chamber substantially surround the treating unit is of value not only in saving space but also in maintaining uniform temperature and flow conditions in the treating spaces of the electrode unit. In previous unidirectional-field electric treaters the flow through the therewider treating spaces has been upward, the flow rate being limited by the necessity that the coalesced masses settle through the rising stream or streams. In the embodiment of FIG. 15 the agglomerated particles are carried along concurrently with the streams in the narrow interelectrode spaces and need not counterflow same to separate. Instead the larger agglomerated particles can drop from the streams directly to the body 108. Those agglomerated particles which require a longer settling time can settle against the slowly rising stream in the annular space 106. The latter should desirably be of much larger cross-sectional area than the composite interelectrode treating spaces, ratios of at least about 3:1 being desirable. It will readily be apparent that the arrangement of FIG. 15 makes possible the use of a relatively small treating unit or electrode unit within a larger container 103 to improve the settling efficiency.

The closely spaced electrodes exemplified in the embodiments of FIGS. 1, 3, 4, 7, 11 and 14 have the advantage of unique electric action and ability to establish fields of high voltage gradient by use of relatively low potentials thus greatly simplifying insulation problems and eliminating the electrical dispersion effects which sometimes take place at the edges of electrodes energized by use of high potentials. Thus gradients of 1.5 and 3.0 kv./in. can be established in treating spaces of a width of 0.2 in. by respective potentials of 300 and 600 volts as compared with potentials of several thousand volts commonly employed in commercial electric treaters. The electrodes described are very effectively used on petroleum fractions or refined petroleum oils of high resistivity and low dispersed-phase content. Oils that have hazed because of the cooling that precipitates some of the dissolved materials or refined oils containing only a fraction of a percent of dispersed contaminants are examples of systems suitable to the closely spaced electrodes of the invention.

The drawings have exemplified the invention in terms of a vertically positioned treating element, with vertical flow therethrough. However, the element is also effective when placed at an angle to the vertical, or in a sloping housing, although in a strictly horizontal position some difficulties could arise by the accumulation of precipitated material which can then not flow from the treating spaces.

As an example of one use of the invention, crankcase drainings from automobile engines have been treated at room temperature in a 2-quart container constructed as shown in FIGS. 1 and 2, the electrode height being 6″ and the diameter of the electrode unit being 4.5″, the interelectrode gap being approximately .08″. In this test the spiral electrodes were spaced by a "Teflon" strip .08″ thick wound spirally around the live electrode strip, as in FIG. 5, the two electrode strips being then wound into a spiral. At a flow rate of approximately 200 ml./min. and with no voltage applied, the influent and effluent oil contained about 4% sediment. When a unidirectional voltage of 100 volts was applied between the electrodes, giving a gradient of about 1.2 kv./in. in the treating spaces, the amount of suspended material in the effluent was reduced to 1%, representing removal of 75% of the obnoxious sediment in a single pass. The current drainage was very small. Even better results can be obtained by treating such oils at elevated temperature. The above test is a very severe one both because of the high content of suspended material and the extreme difficulties encountered in treating the contaminated oil by usual electric treating methods involving the use of electrodes more widely spaced but energized by potentials of correspondingly higher value.

Various changes and other modifications will be apparent to those skilled in the art from a study of the foregoing description of exemplary embodiments and are within the scope of the appended claims.

I claim as my invention:

1. A treating unit adapted for connection to a source of potential to purify contaminated oils flowing therethrough, said treating unit comprising: two concentric spiral electrodes each formed of a long strip of thin metal spiralling outward from an axis in turns of progressively larger radius, the turns of the two electrodes being interspaced to define therebetween narrow spiral-shaped interelectrode spaces each having ingress and egress means, each electrode strip having a spiral lower edge, the spiral lower edge of one electrode being in a plane below the spiral lower edge of the other electrode; electric insulation means electrically insulating said electrodes from each other, said insulation means comprising two long spiral spacers of electric insulation material disposed in a plane transverse to said axis and compressed between adjacent turns of said electrodes exclusively in upper portions of the spiral interelectrode spaces, leaving lower portions of such interelectrode spaces open to form interelectrode treating spaces of a width determined by the thickness of said spacers; and support arms in said plane below said electrodes supporting both electrodes and both spiral spacers, said support arms engaging the spiral edge of said one electrode in supporting relation, said other spiral electrode being supported by said one spiral electrode through said long spacers compressed between said adjacent turns of said electrodes.

2. An electric treater for removing contaminants from oils, said treater including: a housing having a settling chamber; a treating unit comprising a pair of electrodes having a plurality of interspaced turns extending around a central upright axis and two curved spacers of electrical insulation material extending around said axis corresponding in curvature to and compressed between said turns in a single plane transverse to said axis at one axial end of such turns to dispose said spacers exclusively in end portions of the interturn spaces at one end of the treating unit, said spacers having outer faces facing away from said end and inner faces in the interturn spaces only a small distance from said outer faces, said inner faces facing other spacer-free portions of said interturn spaces constituting treating spaces extending from said inner faces of said spacers to the other end of said treating unit, said treating spaces having open ends at said other end of said treating unit; influent means communicating with said treating spaces at positions immediately adjacent said inner faces of said spacers; means for mounting said treating unit in said housing with said open ends of said treating spaces opening on said settling chamber; delivery means for delivering the oil to be treated to said influent means, said oil flowing through said treating spaces and into said settling chamber; means for establishing high-voltage-gradient electric fields in said treating spaces; and means for separately withdrawing settled material and treated oil from said settling chamber.

3. An electric treater for removing dispersed material from oils, said treater including a container having a settling chamber therein closed by a top wall; a treating unit and means for supporting same in said container at a position to be surrounded by portions of said settling chamber, said treating unit comprising a pair of electrodes having a plurality of coaxial interspaced turns having upright treating spaces therebetween with open lower ends opening downward on a lower portion of said settling chamber and spacers of insulating material spacing said turns of said electrodes from each other, said treating unit having a circular peripheral wall and a closure hood below said top wall and above all of said turns and all of said treating spaces, said closure hood being joined to said peripheral wall to form an enclosed feed space communicating with each of said treating spaces, there being an oil space between said hood and said top wall; means for establishing electric fields in said treating spaces comprising a potential source having an energized lead extending through a wall of said container, said last-named means including an insulating bushing at the junction of said lead and said container wall; means including a supply pipe opening on said feed space and forming the sole influent connection thereto for delivering the oil to be treated to the upper portions of said treating spaces for treatment by said electric fields during downward flow in said treating spaces, the treated oil and agglomerated material flowing concurrently through said open lower ends into said lower portion of said settling chamber; means for withdrawing settled agglomerated material from said settling chamber at a level below said treating unit; and means for withdrawing treated oil from said oil space.

4. An electrode structure comprising: a core member; a first electrode including a first long metallic strip having its inner end secured to said core member and spiralling outward therefrom, the spacing between the turns of said first strip being equal throughout an intermediate portion thereof, the innermost end of said strip converging spirally from said intermediate portion to said core member to form an inner junction zone, the outermost turn of said strip converging toward its immediately-inward turn to form a tapered space therebetween comprising an outer junction zone; a second electrode including a second long metallic strip shorter than said first strip disposed in spiral turns between the turns of said intermediate portion of said first strip, said second strip having ends terminating respectively in said inner and outer junction zones; and spacers of electrical insulation material compressed between said second strip and the turns of said intermediate portion of said first strip spacing said turns of said second strip centrally between the turns of said first strip and providing interelectrode spaces of equal width between the adjoining turns of the two strips, the electrical insulation material of said spacers filling only a portion of said interelectrode spaces.

5. An electrode structure as defined in claim 4 in which said first electrode is a grounded electrode and in which its said outermost turn is wrapped back on its said immediately-inward turn to contact same and form a substantially cylindrical peripheral wall.

6. An electric treater for removing contaminants from oils, said treater including: a housing having a settling chamber; a treating unit comprising a pair of electrodes having a plurality of interspaced turns extending around an axis and spacers of electrical insulation material extending around said axis and compressed between said turns in a single plane transverse to said axis at one axial end of such turns to dispose said spacers exclusively in portions of the interturn spaces at one end of the treating unit, other spacer-free portions of said interturn spaces constituting treating spaces extending from the vicinity of said spacers to the other end of said treating unit, said treating spaces having open ends at said other of said treating unit; means for mounting said treating unit in said housing with said open ends of said treating spaces opening on said settling chamber; influent means communicating with said treating spaces adjacent said spacers, said influent means including openings through said turns of said electrodes communicating with each other and opening on said treating spaces at positions closer to said transverse plane than to said open ends of said treating spaces; delivery means communicating with said openings for delivering the oil to be treated to said influent means, said oil flowing through said treating spaces and into said settling chamber; means for establishing high-voltage-gradient electric fields in said treating spaces; and means for separately withdrawing settled material and treated oil from said settling chamber.

7. An electric treater as defined in claim 6 in which said openings are separated from the plane of said spacers to form between the openings and said spacers an insulation protective zone in each interturn space, and including a second influent means opening on said protective zones, and a second delivery means for delivering a dielectric fluid substantially free of contaminants to said protective zone concurrently with the delivery of the oil to be treated to said openings through said first-named delivery means.

8. An electric treater as defined in claim 7 in which said second influent means includes narrow passages traversing said spacer opening at their ends respectively on said insulation protective zones and a space at one end of said treating unit, said second delivery means including a hood enclosing said space.

9. A treating unit for removing dispersed material from oils containing same, including in combination: a housing providing a passage circular in cross-section having a central axis; support means in said passage; an electrode unit substantially completely filling a cross-section of said passage and positioned by said support means, said electrode unit including a pair of metallic strip electrodes having a plurality of coaxial interspaced turns extending spirally around the axis of said passage and two spacers formed of strips of electrical insulating material spiralling around said axis in a transverse plane adjacent one edge of each of said metallic strips filling only a portion of the interelectrode spaces and compressed between adjacent turns of the electrodes to space same and form therebetween in other portions of said interelectrode spaces a plurality of treating spaces each much less in width measured radial to said axis than in length measured in the general direction of said axis, said spacer strips having openings therethrough extending in the direction of said axis communicating with said treating spaces, said treating spaces having entrance and exit portions, a portion of said passage at one end of said electrode unit being an entrance zone communicating with said entrance portions of said treating spaces adjacent said spacer strips; walls forming a settling zone at the other end of said electrode unit, said exit portions opening directly on said settling zone, said interelectrode spaces forming substantially the sole communication between said zones; means electrically connected to said electrodes for establishing electric fields in said treating spaces; means for introducing a stream of the oil to be treated into said entrance zone to flow through said treating spaces to said separation zone; and separate pipes communicating with said separating zone at different levels withdrawing respectively therefrom treated oil and dispersed material separating therefrom as a result of treatment in said electric fields.

10. A treater for removing dispersed material from oils containing same, said treater including in combination: a closed container; a closed-top tubular housing mounted in said container with its axis substantially vertical and with its lower end spaced above the bottom of said container, the space within said container around and below said housing forming a settling space, said lower end of said tubular housing being an open end opening directly on that portion of said settling space below said housing; spaced electrodes in said tubular housing comprising two spiral electrode strips spaced by insulators exclusively in the upper ends of the interelectrode spaces, said spaced electrodes providing upright treating spaces having upper entrance ends communicating with the upper interior of said closed-top tubular housing and lower exit ends openly communicating with said portion of said settling space; means for establishing electric fields in said treating spaces; means for delivering the oil to be treated to said upper interior of said tubular housing below the closed top thereof and for introducing such oil at entrance positions of said interelectrode spaces below said insulators to flow downward through said treating spaces and discharge into said portion of said settling space, the dispersed material settling in said space to form a body of separated dispersed material in the bottom thereof, the treated oil rising in said space around said housing to the top of said settling space; pipe means communicating with the top of said settling space withdrawing treated oil therefrom; and pipe means communicating with the bottom of said settling space withdrawing separated dispersed material therefrom.

11. A treater as defined in claim 10 including means for introducing an insulator protecting fluid into those portions of said interelectrode spaces below said insulators and above said entrance positions.

12. A treating unit adapted for connection to a source of potential to purify contaminated oils flowing therethrough, said treating unit comprising: an electrode unit having two ends spaced from each other along an axis, said electrode unit comprising two electrodes having a plurality of coaxial interspaced turns extending around said axis, and spacers comprising strips of electrical insulation material compressed between adjacent turns exclusively at one end of the electrode unit to form interelectrode spaces occupied only at said one end of said spacers, the remainder of the interelectrode spaces being interelectrode treating spaces opening on the other end of said electrode unit to form an egress means for said treating spaces; and ingress means communicating with said interelectrode treating spaces near said one end of said electrode unit, said ingress means including openings through said electrodes near said one end of said electrode unit communicating with said interelectrode treating spaces, said spacers being positioned between said openings and said one end of said electrode unit.

13. A treating unit adapted for connection to a source of potential to purify contaminated oils flowing therethrough, said treating unit comprising: an electrode unit having two ends spaced from each other along an axis, said electrode unit comprising two electrodes having a plurality of coaxial interspaced turns extending around said axis, and spacers comprising strips of electrical insulation material compressed between adjacent turns exclusively at one end of the electrode unit to form interelectrode spaces occupied only at said one end by said spacers, the remainder of the interelectrode spaces being interelectrode treating spaces opening on the other end of said electrode unit to form an egress means for said treating spaces; and ingress means communicating with said interelectrode treating spaces near said one end of said electrode unit, said ingress means including a plurality of passages extending substantially parallel to said axis in the zone occupied by said spacers, said ingress means including also openings through said electrodes near said one end of said electrode unit communicating with said interelectrode treating spaces.

14. A treating unit adapted for connection to a source of potential to purify contaminated oils flowing therethrough, said treating unit comprising: an electrode unit having two ends spaced from each other along an axis, said electrode unit comprising two long strips of metal wrapped in spaced spiral turns spiralling outward around said axis in turns of progessively larger radius, and two long foraminous strips of insulating material compressed between the spiral turns of the two long strips of metal in spiral turns spiralling outward around said axis, each strip of insulating material having passages therethrough throughout the length thereof said spiral-turn strips of metal forming electrodes electrically insulated and spaced from each other solely by said strips of insulating material compressed therebetween, the insulating material occupying only a portion of the interelectrode spaces formed between the spaced spiral turns of said two metal strips; ingress means including walls at one end of said electrode unit forming an enclosed confined space exiting exclusively to said passages and a supply pipe communicating with said enclosed confined space; and means for supporting one of said spiral-turn electrodes, the other of said electrodes being supported by the two spiral-turn foraminous strips of insulating material compressed between the spiral turns of said electrodes.

References Cited in the file of this patent

UNITED STATES PATENTS

| | | |
|---|---|---|
| 2,257,129 | Ruben | Sept. 30, 1941 |
| 2,422,606 | Williams | June 17, 1947 |
| 2,849,395 | Wintermute | Aug. 26, 1958 |
| 2,855,356 | Stenzel | Oct. 7, 1958 |

FOREIGN PATENTS

| | | |
|---|---|---|
| 920,479 | France | Jan. 4, 1947 |
| 463,373 | Canada | Feb. 28, 1950 |
| 615,455 | Germany | July 5, 1935 |

UNITED STATES PATENT OFFICE
CERTIFICATE OF CORRECTION

Patent No. 3,117,920 January 14, 1964

Richard W. Stenzel

It is hereby certified that error appears in the above numbered patent requiring correction and that the said Letters Patent should read as corrected below.

Column 9, line 70, after "other" insert -- end --; column 10, line 23, for "spacer" read -- spacers --; column 11, line 32, for "of said spacers" read -- by said spacers --.

Signed and sealed this 23rd day of June 1964.

(SEAL)

Attest:

ERNEST W. SWIDER
Attesting Officer

EDWARD J. BRENNER
Commissioner of Patents